United States Defensive Publication [19] (H) [11] T994,003

Kilminster [43] May 6, 1980

[54] AZO DYES, AZO DYE-RELEASING COMPOUNDS AND PHOTOGRAPHIC PRODUCTS AND PROCESSES EMPLOYING THEM

[76] Inventor: Kenneth N. Kilminster, Kodak Limited, London, England

[21] Appl. No.: 77,876

[22] Filed: Sep. 21, 1979

Related U.S. Application Data

[62] Division of Ser. No. 870,314, Jan. 18, 1978, abandoned.

[51] Int. Cl.[3] ..... G03C 5/54

[52] U.S. Cl. ..... 430/242; 430/390; 430/562; 260/202

[57] ABSTRACT

Photographic elements, diffusion transfer assemblages and processes are described which employ a novel non-diffusible compound having a novel releasable azo dye. The dyes are azophenols, or precursors of azophenols, and have an electron withdrawing group in one of the positions ortho to the phenolic hydroxy group and a carbamoyl electron withdrawing group in the other position ortho to the phenolic hydroxy group.

16 Claims, No Sheets Drawing,

81 Pages Specification

The file of this unexamined application may be inspected and copies thereof may be purchased (849 O.G. 1221, Apr. 9, 1968).